June 2, 1931.  R. T. GILLETTE ET AL  1,808,541
WELDING TORCH
Filed Sept. 12, 1927
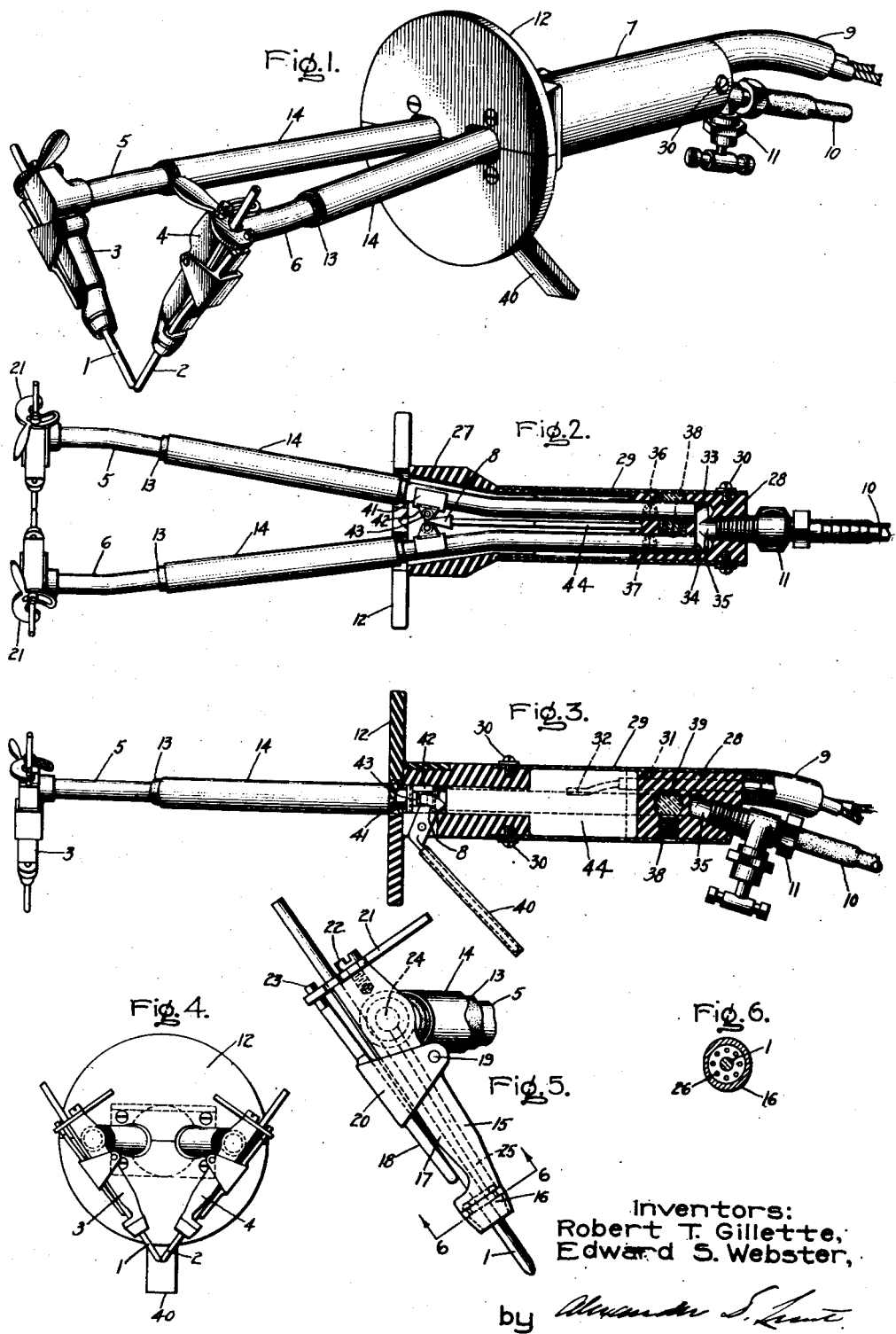
Inventors:
Robert T. Gillette,
Edward S. Webster,
by
Their Attorney.

Patented June 2, 1931

1,808,541

UNITED STATES PATENT OFFICE

ROBERT T. GILLETTE, OF SCHENECTADY, AND EDWARD S. WEBSTER, OF TROY, NEW YORK, ASSIGNORS TO GENERAL ELECTRIC COMPANY, A CORPORATION OF NEW YORK

WELDING TORCH

Application filed September 12, 1927. Serial No. 218,893.

Our invention relates to electric welding and more particularly to improvements in apparatus wherein an electric arc is maintained between a plurality of electrodes and a gaseous medium is supplied to the arc.

Our invention is particularly applicable to the utilization of the heating effect of flames of atomic hydrogen. The utilization of such atomic hydrogen flames is disclosed and claimed broadly in the co-pending application of Irving Langmuir, Serial No. 729,185 filed July 30, 1924, for heating process and apparatus, which application is assigned to the same assignee as the present application. While our invention is well suited for atomic hydrogen flame welding many of the features of construction thereof are of general application to the type of welding apparatus wherein an arc is maintained between a plurality of electrods supported adjacent to work and is especially applicable to such types of welding apparatus wherein a welding medium of any suitable character is provided.

Both the striking voltage and the arc voltage are higher for an arc in hydrogen than for the ordinary welding arc in air. With direct current a line voltage of 250 volts has been found to give good results. With alternating current voltages from 350 to 400 volts give satisfactory operation although by the use of suitable reactors this voltage may be reduced to 300 volts or even less. Voltages as high as this are needed solely to give stability and to enable the arc to be started at any time by separating the electrodes. In normal operation the drop across the arc in hydrogen is in the neighborhood of 60 to 100 volts depending upon the separation of the electrodes. With current values of from 20 to 70 amperes and a separation of the electrodes of from $\frac{1}{16}''$ to $\frac{1}{8}''$ the operating voltage of the arc is from 60 to 80 volts.

It is an object of our invention to provide a welding torch wherein the current conducting parts are suitably insulated in a manner to eliminate the danger of shock to an operator who may be using the torch, as well as to prevent flashes resulting from short circuiting parts of the torch.

Another object of our invention is to provide an improved electrode holder which also serves as a means for discharging the welding medium about the electrode inserted in the holder.

Our invention will be better understood from the following description taken in connection with the accompanying drawings and its scope will be pointed out in the appended claims.

In the drawings Fig. 1 is a perspective view of a torch embodying our invention, Figs. 2 and 3 are top and side views of the same torch with the handle portion in section, and Fig. 4 is an end view of the torch showing the arrangement of the electrode holders. Fig. 5 is a detail of one of these electrode holders, and Fig. 6 is a section along the line 6—6 of the tip of the electrode holder shown in Fig. 5.

In the torch shown in the drawings the arc-supporting electrodes 1 and 2 are clamped in holders 3 and 4. These holders are inclined at an angle to one another and attached to the ends of resilient tubes 5 and 6 which act as spring members. The other ends of these tubes terminate within a handle 7. The electrodes 1 and 2 may be moved relative to one another in order to strike and control an arc maintained between the electrodes during welding by deflecting the spring members relative to one another by any suitable means such as the wedge 8 shown in Figs. 2 and 3. Electricity is supplied from a suitable source to the electrodes through holders 3 and 4, tubes 5 and 6, and a twin conductor 9 which enters the handle 7 at its rear end and makes contact with the tubes at a point within the handle.

Gas is supplied to the arcing tips of the electrodes from a suitable source of supply, through holders 3 and 4, tubes 5 and 6 and a pipe 10. The supply of gas may be controlled by a valve 11 supported in the end of the handle 7. As will appear more in detail later, valve 11 is insulated from tubes 5 and 6 by means of the insulating material of the handle. The torch is provided with an insulating shield 12 and the tubes 5 and 6 are insulated throughout the greater portion of their exposed length by mica tubes 13 which in turn are protected from destruction through wear and tear under conditions of use by tubes 14 which may be made of metal.

The construction of the electrode holders is shown more in detail in Fig. 5 which illustrates the holder 3 of the torch shown in the drawings. This holder comprises a body member 15 terminating in an annular tip 16 through which the electrode extends. The electrode is held in a groove 17 formed in the outside surface of member 15 above the tip 16 by a clamping member 18 pivotally supported on member 15 at 19 by a saddle member 20 forming a part of the clamping member. The lower end of this clamping member 18 is forced into engagement with the electrode 1 by a cam member 21 which in the arrangement illustrated is slotted to cooperate with screw 22. The cam member acts on the clamping member 18 through a pin 23 located at the upper end of the member 18. Gas is supplied through pipe 10, and an opening 24 in the sidewall of the member 15, into a central passage 25 extending the length of member 15, and thence into tip 16 from which it is discharged about the electrode through openings 26.

The handle 7, as illustrated in the drawings, is made up of a plurality of pieces of suitable insulating material such, for example, as bakelite. As shown in Figs. 2 and 3 a head block 27 and a tail block 28 are secured to each other by a tube 29 which is joined to each block by screws 30. The tail block 28 is provided with passageways 31 for the conductors of cable 9 which are connected at 32 to tubes 5 and 6. This block is also provided with communicating passageways 33, 34 and 35 through which gas flows from tube 10 and valve 11 into tubes 5 and 6. The ends of tubes 5 and 6 are located in passageways 33 and 34 and held in place by set screws 36 and 37. A third set screw 38 made of insulating material is also provided for clamping the tubes in place. Passage 35 is threaded at its outer end for the reception of valve 11 through which gas is supplied, as previously described. A transverse opening 39 is also provided in the block 28 for inserting an insulating cement about tubes 5 and 6 and into that portion of the passages 33 and 34 into which the tubes 5 and 6 extend to make a gas-tight joint between these tubes and the block 28.

The head block 27 is provided with a funnel-shaped opening through which the diverging tubes 5 and 6 extend. Attached to the adjacent surfaces of each of the tubes 5 and 6 are clips 41 for supporting insulating roller holders 42 provided with rollers 43. Between these rollers the wedge 8, previously referred to, may be inserted by means of a trigger member 40 to force the tubes apart and thus separate the electrodes 1 and 2 to strike and control the arc. The trigger member 40 is insulated as are the other parts of the handle of the torch so that it is impossible for the operator to come in contact with electrically conductive parts. The tubes 5 and 6 are separated from one another in the handle 7 by an insulating barrier 44.

It is, of course, apparent that the handle 7 instead of being fabricated of the various parts described above may be molded of an insulation material into a unitary structure in which the torch parts are positively held and accurately located in substantially the same manner as described. It is also apparent that the cam 21 of the electrode holder shown in the drawing may be replaced by some other suitable arrangement for forcing the member 18 into clamping engagement with the electrode. Other changes may be made in the structure and arrangement of the torch illustrated without departing from the spirit of the present invention. The terms of the appended claims are, therefore, not restricted to the precise arrangement above disclosed but are intended to cover all changes and modifications within the true spirit and scope of our invention.

What we claim as new and desire to secure by Letters Patent of the United States, is:—

1. A welding torch comprising a plurality of electrode holders, a spring member for independently supporting each of said electrode holders, and means movable relatively to and acting on each of said spring members for deflecting them relatively to one another to move said electrode holders relative to one another.

2. A welding torch comprising a plurality of electrode holders, means for discharging a welding medium about electrodes adapted to be inserted in said holders, tubes for supplying electric current to said holders and a welding medium to said discharge means, and a handle made of insulating material within which said tubes are inserted and enclosed, said handle having channels extending through the insulating material and terminating in said tubes for supplying a welding medium to said tubes while electrically insulating said tubes from the source of supply of said medium.

3. A welding torch comprising an electrode holder of electrically conductive material, means for discharging a welding medium about an electrode inserted in said holder, a tube of electrically conductive material electrically and mechanically connected to said holder for supporting said holder and said gas discharge means as well as for conducting a welding medium to said discharge means and means for attaching an electrical conductor to said tube for supplying electric current to said electrode holder.

4. A welding torch comprising an electrode holder of electrically conductive material, means for discharging a welding medium about an electrode inserted in said holder, a tube of electrically conductive material electrically and mechanically connected to said holder for supporting said holder and said gas discharge means as well as for conducting a welding medium to said discharge means and means for attaching an electrical conductor to said tube at a point remote from the electrode holder for supplying electric current to said electrode holder, means for insulating said tube throughout its length except at its terminal where the electrode holder is supported and means for protecting against wear and destruction that part of said insulating means next to said electrode holder.

5. An electrode holder comprising a hollow, elongated, externally grooved body member terminating in a hollow annular tip through which an electrode lying in the groove of said holder is adapted to pass, said tip being provided with openings for discharging a welding medium supplied to said holder about the electrode extending through said tip, a clamping member adjacent the groove for clamping an electrode in said holder, means for forcing said clamping member into engagement with an electrode in said holder, and means for supplying a welding medium to said hollow electrode holder.

6. A welding torch comprising holders for supporting a plurality of electrodes in inclined relation to one another, means for discharging jets of gas about electrodes adapted to be inserted in said holders so as to enclose said electrode tips in said gas and to produce a resultant stream of gas across the tips of said electrodes, resilient tube members for supporting said holders and said discharge means as well as for supplying gas to said discharge means and electricity to said holders, a handle made of an insulating material within which one end of each of said tubes is enclosed, means for supplying gas to said tubes including channels formed in the insulating material of said handle, means for attaching electrical conductors to said tubes within said handle, insulating tubes about the exposed portion of said tubes extending from said handle, and means for flexing said tubes to control the relative positions of the arcing tips of electrodes inserted in said holders.

In witness whereof, we have hereunto set our hands this 10th day of September, 1927.

ROBERT T. GILLETTE.
EDWARD S. WEBSTER.